United States Patent [19]

Nawotka

[11] Patent Number: 5,520,955
[45] Date of Patent: May 28, 1996

[54] AQUEOUS SPOT FILLERS AND THEIR USE IN PROCESSES FOR THE PREPARATION OF MULTI-LAYER COATINGS

[75] Inventor: Otfried Nawotka, Wuppertal, Germany

[73] Assignee: Herberts Gesellschaft mit beschrankter Haftung, Wuppertal, Germany

[21] Appl. No.: 232,443

[22] Filed: Apr. 21, 1994

Related U.S. Application Data

[63] Continuation of Ser. No. 114,690, Aug. 31, 1993, abandoned.

[30] Foreign Application Priority Data

Sep. 8, 1992 [DE] Germany ............ 42 29 983.7

[51] Int. Cl.$^6$ ...................................................... B32B 35/00
[52] U.S. Cl. .................... 427/140; 427/142; 427/379; 427/407.1; 427/409; 427/412.1
[58] Field of Search ..................................... 427/140, 142, 427/407.1, 409, 412.1, 379

[56] References Cited

U.S. PATENT DOCUMENTS

| | | | |
|---|---|---|---|
| 4,240,938 | 12/1980 | Kraft et al. | 428/414 X |
| 4,360,120 | 11/1982 | Samuel et al. | 524/494 |
| 4,659,589 | 4/1987 | Jimenez | 427/140 |
| 5,279,862 | 1/1994 | Concoran et al. | 427/142 X |

*Primary Examiner*—Michael Lusignan
*Attorney, Agent, or Firm*—Schweitzer Cornman & Gross

[57] ABSTRACT

Aqueous spot fillers, containing at least one water dilutable, olefinically unsaturated binder, conventional pigments, fillers and adjuvants, corresponding to a solids content of 50–90 wt %

10–40 wt % of water and

0–10 wt % of one or more organic solvents, the water dilutable, olefinically unsaturated binders containing anionic groups or groups convertible to anionic groups, corresponding to an acid number of 25–175 and being the reaction products of A) 40–80 wt % of one or more polydiene oils, B) 5–25 wt % of one or more polymerisable olefinically unsaturated monomers containing anionic groups or groups convertible to anionic groups, C) 0–10 wt % of one or more bis-(2-oxazolines) and D) 0–40 wt % of one or more ethylenically unsaturated monomers.

the percentages of A), B), C) and D) adding up to 100 wt %.

The spot fillers can be used for the preparation of multi-layer coatings, especially on motor vehicles.

2 Claims, No Drawings

AQUEOUS SPOT FILLERS AND THEIR USE IN PROCESSES FOR THE PREPARATION OF MULTI-LAYER COATINGS

This is a continuing application of U.S. Ser. No. 08/114,690, filed on Aug. 31, 1993, now abandoned.

The invention refers to aqueous spot fillers (hard putty or patching compounds or surfacers) and to processes for the preparation of multi-layer coatings using such spot fillers. They are particularly usable for the lacquering of motor vehicles, industrial vehicles and machines.

Spot fillers are used in industry in order to cover uneven surfaces and in order to achieve an homogenous base layer. Since the hardened compositions undergo mechanical stress, it is necessary that the spot fillers show a good adhesion to the background and to the following lacquer layers. Further, it is necessary that the compositions can be applied as thick layers and that they can be handled easily, e.g. that they have good drawing characteristics. Further, good and quick curing is necessary. An essential aspect is the sanding ability, i.e. it is necessary that after applying and curing of a coating layer of the spot filler its surface can be sanded. Further, it is necessary to achieve good optical qualities of the prepared layers.

It is known to use solvent-containing and solvent-free physically drying or oxidative drying binders for such spot fillers. The spot fillers are prepared by mixing them with pigments, fillers, organic solvents and adjuvants and dispersing such mixtures with specific machine units. Known binders are unsaturated polyesters, which can be hardened by peroxides (Glasurit Handbuch "Lacke und Farben", 11th edition, page 530 f, Hannover 1984). The obtained spot fillers contain a high portion of solvents. In view of the high solvent content it is difficult to handle the obtained spot fillers. When handling the spot fillers the solvents escape into the surrounding air. Spot fillers containing styrene are particularly dangerous. The use of coating agents containing solvents is critisized in view of the health risks and surroundings.

It has been tried to reduce solvent emission. Thus, DE-A-40 28 628 describes an unsaturated polyester resin composition having a specific waxy adjuvant showing a reduced emission of styrene. However, such spot fillers still smell strongly of styrene.

EP-A-O 310 972 describes radically curable mixtures for spot fillers on the basis of unsaturated polyester resin; the mixtures contain condensation products of unsaturated carboxylic acids with ethylene glycol or propylene glycol together with styrene; as an adhesive they contain a polyester having acryloyl groups. These products still contain styrene.

Up to now no aqeuous spot fillers for metal substrates are known in practice. Up to now the use of water as a solvent impaired the viscosity of the products, the pigment sedimentation and the storage stability. Further, a risk of corrosion existed, especially of iron substrates.

JP patent publication 62 241 901 describes a self-dispersing water soluble resin system to be used in adhesives. The resin system contains portions of polymers with polymerizable double bonds and salt-forming groups as well as portions of copolymerizable monomers having double bonds. The polymerization is carried out in an organic hydrophilic solvent. The product is neutralized and transferred into the aqueous phase by the addition of water and removal of the organic solvents. No specific composition of the binder dispersion for the preparation of spot fillers usable on surfaces which are not absorbative are described.

Therefore, it is an object of the invention to provide spot fillers (hard putty or patching compounds) having a good processability, which dry quickly even at room temperature, which can be easily sanded after curing and which contain only small amounts of organic solvents. Further, good storage stability shall be achieved.

It has now been found that this object can be achieved by the present invention, using water dilutable binders containing ethylenically unsaturated bonds and anionic groups or groups convertible into anionic groups corresponding to an acid number of 25–175, which are the reaction products of A) 40–80 wt % of one or more polydiene oils, B) 5–25 wt % of one or more polymerizable ethylenically unsaturated monomers containing anionic groups or groups convertible to anionic groups, C) 0–10 wt % of one or more bis-(2-oxazolines) and D) 0–40 wt % of one or more ethylenically unsaturated monomers, as spot fillers (hard putty or patching compounds or surfacers) containing water as a main solvent, as well as pigments, fillers and conventional lacquer adjuvants, together with an optional small amount of one or more organic solvents.

Further, the invention refers to an aqueous spot filler containing at least one water dilutable, olefinically unsaturated binder, conventional pigments, fillers and adjuvants, corresponding to a solids content of 50–90 wt %, 10–40 wt % of water and 0–10 wt % of one or more organic solvents, the water dilutable, olefinically unsaturated binders containing anionic groups or groups convertible to anionic groups, corresponding to an acid number of 25 to 175 and being the reaction products of A) 40–80 wt % of one or more polydiene oils, B) 5–25 wt % of one or more polymerizable olefinically unsaturated monomers containing anionic groups or groups convertible to anionic groups, C) 0–10 wt % of one or more bis-(2-oxazolines) and D) 0–40 wt % of one or more ethylenically unsaturated different monomers, the weight percentages of A), B), C) and D) adding up to 100 wt %.

The spot fillers of the invention contain water dilutable binders on the basis of polymerisates of olefinically unsaturated monomers. Such binders and their preparation are described e.g. in EP-A 0 268 035, EP-A 0 238 108, DE-A 41 32 077 and EP-A 0 170 184.

They are water dilutable binders on the basis of polydiene oils together with further ethylenically unsaturated copolymerizable monomers. At least part of the monomers, i.e. component B), has anionic groups or groups convertible to anionic groups. Preferably the binders have a number average molecular weight (Mn) of 300 to 50000 g/mole, particularly preferred of 1000 to 10000 g/mole. The acid number is 25 to 175, preferably 50 to 150.

Preferably more than 40 wt %, particularly preferred more than 50 wt % of polydiene oils are used as component A). The upper limit is preferably below 80 wt %, particularly preferred below 70 wt %.

Polydiene oils and polydienes having a number average molecular weight (Mn) of 300 to 5000, preferably 1000 to 3000, viscosities of 500 to 5000 mPas (at 20° C.), an iodine number of 200 to 500 g iodine/100 g substance, are preferred; preferably they contain 1.4-cis and/or 1.4-trans bonds. They are commercial products known to the skilled person. Examples are polybutadiene oils of different configurations or polypentadiene oils. It is also possible to use mixtures of such polydiene oils, e.g. mixtures of polybutadiene oils having different molecular weights and different configurations and/or polypentadiene oils. Preferred are polybutadiene oils having more than 60% of 1.4-cis content and a content of 1.2-vinyl groups, which is as low as possible (preferably below 5%), the percentages in each case relating to the amount of double bonds present.

Such polydiene oils can be prepared by polymerization of diene monomers, such as butadiene and pentadiene. They can be copolymerized with, e.g. up to 25 wt %, relating to the total monomers, of one or more copolymerizable monomers. Examples for comonomers are styrene, methylstyrene, vinyl toluene, (meth) acrylic acid, vinyl acetic acid, maleic acid as well as derivatives thereof, e.g. esters of such acids and the mixtures thereof. Examples of such polydiene oils are butadiene copolymerisates, containing 25 wt % of different comonomers, such as defined above, incorporated by polymerization.

Ethylenically unsaturated copolymerizable monomers, containing ionic groups or substituents convertible to ionic groups are used as component B). Examples for such groups are anionic groups such as —$SO_3H$, —$PO_3H$ or —COOH. Carboxylic groups and their anhydrides are preferred.

Preferred examples are ∝-,β-ethylenically unsaturated monocarboxylic and dicarboxylic acids, acrylic acid, methacrylic acid, itaconic acid, maleic acid, fumaric acid or the mixtures or anhydrides thereof. Maleic anhydride and/or itaconic anhydride are preferred.

At least 5 wt %, preferably more than 8 wt % of ∝, β-unsaturated carboxylic acid are used as component B). The upper limit is 25 wt %, preferably below 22 wt %

If acid anhydrides are used, they can be cleaved by the addition of water or monoalcohols or monoamines to furnish compounds containing acid groups. Examples for such alcohols are lower linear monoalcohols, such as methanol, ethanol, propanol, butanol, cyclohexanol or methoxypropanol.

The preparation of the adducts of polydiene oil (A) and ∝,β-unsaturated monomer (B) containing ionic groups, e.g. unsaturated carboxylic acids, can be carried out in accordance with known methods. As an example, mixtures of the components are heated for 1 to 4 hours to temperatures of, e.g. 150° to 250° C.; optionally it is possible to add 0.01 to 0.5 wt %, relating to the total weight of (A) and (B), of one or more polymerization inhibitors, such as, e.g. hydroquinone, benzoquinone, substituted diphenyl amines or thio compounds, such as mercapto benzimidazole. It is, e.g. possible to work under a stream of an inert gas and it is optionally possible to add low amounts of aromatic solvents.

It is possible to carry out the reaction of component A) with component B) in an inert solvent. Solvents which are not detrimental to the spot filler obtained as an end product, are preferred.

If an adduct from component A) is prepared with an ∝, β-unsaturated dicarboxylic acid or its anhydride, it can preferably be partially transferred into an amide by a compound with an amino group, the anhydride group being cleaved. It is possible to carry out this partial amidation in accordance with usual processes. As an example, the adduct is reacted with the amino-group-containing compound optionally in the presence of an inert solvent, at elevated temperatures of, e.g. 30° to 150° C., possibly in the presence of an inhibitor and/or a catalyst.

Partial amidation of the polydiene oil, reacted with an ∝, β-unsaturated dicarboxylic acid, e.g. of a maleinated polybutadiene oil, means the ring-opening reaction of preferably 10 to 90 mole % of the anhydride groups present in the product.

The preferably used amines are secondary and/or primary amines. Secondary monoamines, particularly dialkylamines, such as diethylamine, diisopropylamine, dibutylamine or diethanolamine are particularly preferred. It is also possible to use mixtures.

As mentioned above, the reaction products of A) and B) can be reacted with component C). Up to 10 wt % of bis-(2-oxazoline), preferably less than 5 wt %, can be used as component C).

The bis-(2-oxaline) derivatives are characterized by the following general formula:

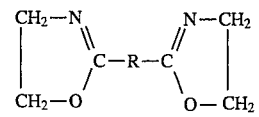

wherein R is a bivalent (having the valence of two) linear or branched alkyl, cycloalkyl or aryl group which can optionally be substituted, particularly a phenyl group. Preferred bis-(2-oxazoline) derivatives are, e.g. 1.3-phenylene-bis(2-oxazoline), 1.4-phenylene-bis(2-oxazoline) and 1.4-cyclohexyl-bis-(2-oxazoline).

A higher molecular weight is achieved by the reaction of carboxyl groups containing reaction products of components A) and B), which can be partially amidated, with bisoxazolines. Linear polyester amides are obtained if equimolar amounts of bis-2-oxazolines and carboxylic acid groups are used.

The binders used in accordance with the invention are reaction products of A) and B) and optionally C) and/or D). Preferably, components A) and B) are reacted first, whereafter further reaction or grafting can be carried out with components C) and/or afterwards with D).

After the reaction of A) and B), or after the reaction of A), B) and C), it is possible to react or graft one or more ethylenically∝, β-unsaturated monomers as component D).

Preferred monomers contain at least one radically polymerizable ethylenic double bond. Examples are vinyl compounds, vinylidene compounds, acryl and methacryl compounds, such as styrene, ∝-methyl styrene, vinyl toluene; acrylic acid esters and methacrylic acid esters of $C_1$–$C_{12}$ alcohols which can be linear, branched or cyclic; allyl acrylate, allyl methacrylate, methacrylic acid, acryl amide and mixtures of these monomers. Hard monomers which have no further functional groups, i.e. providing homopolymers having a glass transition temperature of 25° to 200° C., are preferred. Particularly preferred is the reaction with styrene.

The amount of monomers D) used in accordance with the invention depends on the monomers. Preferably the amount is 1–40 wt % and particularly preferred, more than 10 and less than 35 wt %, relating to the amount of the product to be grafted, which optionally can be partially amidated and ester amidated.

The adduct, prepared from the above-mentioned starting materials A), B) and optionally C) and/or D), is not water-dispersable. In order to render it water-dilutible, the ionic groups of the adduct are at least partially neutralized. This neutralization comprises 15 to 100%, preferably 20 to 80% of the ionic groups. Examples for neutralization agents of acid groups are the amines and further neutralization agents which are listed below.

Further, it is possible to hydrolize optionally present anhydride groups in the presence of tertiary, secondary and primary amines, such as methyl amine, ethyl amine, propylamine, dimethylamine, diethylamine, dipropyl amine, trimethylamine, triethylamine and triethanolamine with water and to neutralize the free carboxyl groups. Basic compounds which can be used for this neutralization can be the abovementioned amines as well as ammonia, alkaline metal (e.g. lithium, sodium and potassium) hydroxides, oxides, carbonates and/or hydrogen carbonates.

In accordance with the invention the graft reaction of the polymerizable ethylenically unsaturated monomers D) to the polybutadiene oil, which is already modified in analogy to a polymer, is preferably carried out in the same way as usual with the emulsion polymerization of polymerizable vinyl monomers e.g. by reaction of the neutralized products of A), B) and optionally C), with the radically polymerizable ethylenically unsaturated monomers D). This reaction e.g. is carried out in the presence of a radical-forming polymerization initiator, e.g. at 10° to 120° C., in an aqueous emulsion, optionally under pressure. Examples for usable polymerization initiators are azocompounds, such as 2.2'-azo-bis(isobutyronitril) and usual peroxides such as tertiary butyl peroxybenzoate or butyl peroxy-2-ethyl-hexanoate or hydroperoxides.

Preparing the binders, it is preferred to react initially the components A) to C) in turn, without addition of water. The further reaction with the monomers D) is preferably carried out in an aqueous phase after addition of water, neutralization agent and optional further auxiliary substances, which are added before disperging. The binder can contain further different resins together with the reaction products of components A) to D). These are preferably physically drying resins. It is preferred to add such additional binders in amounts of less than 20 wt %, particularly preferred less than 15 wt %, e.g. in the form of physically curing resins. Physically curing resins which may optionally be present are, e.g. known maleinate resins, such as Alresat$^R$ KM 313, rosin-modified phenolic resins, such as Albertol$^R$ KP 626 (Hoechst), ketone-formaldehyde resins such as Kunstharz SK$^R$ (Hüls) or Ketonharz N$^R$ (BASF).

It is suitable to insert the additional resin into the melt of the resins before dissolving the binder in water, in order to achieve an even distribution of the physically drying resin in the aqueous polydiene binder, e.g. a polybutadiene binder. It is possible to carry out the reaction of D) with the polydiene oil in the presence of the additional resins.

Additional binders, which can be added in amounts of 0–20 wt % are water dispersible polyurethane or polyester resins. They are known binders, which can be transferred into the aqueous phase via anionic groups and/or hydrophilic non-ionic groups. Examples for such binders are described in EP-A-O 089 497, EP-A-O 228 003 or EP-A-O 021 414.

The binders usable in accordance with the present invention, can be neutralized with e.g. organic bases, and transferred into the aqueous phase. Preferably they are in the form of aqueous binder solutions. The expression binder solution indicates solutions, dispersions or emulsions of the binder in water. The solutions of the binders are essentially aqueous, optionally they can contain small amounts of organic solvents. The solvents can be inserted during the preparation of the binders; however, it is also possible to add them later, in order to adjust the quality of the lacquers, e.g. the flow.

The solids content of the aqueous binder solutions is preferably 15–60 wt %. The viscosity of the binders is preferably 10 to 1000, particularly preferred 20–500 mPas as a 20% aqueous solution. It is possible to use mixtures of binders. Preferably 20 to 80% of the ionic groups of the binders are neutralized.

Further, the spot fillers contain conventional pigments and fillers. Examples of pigments or fillers are iron oxide, titanium dioxide, barium sulphate, zinc oxide, mica, kaolin, quartz flour, talc and/or different kinds of silica. It is also possible to use organic colour pigments. Further, it is possible to use anti-corrosive pigments, such as lead oxide, lead silicate or zinc phosphate. The particle size of the pigments is up to 100 um. Preferably it is also possible to use portions of cross-linked organic fillers which have the necessary particle size and do not swell in the different adjuvants.

The ratio of pigment-filler/binder is, e.g. 0.5 to 12.5:1, preferably 1.0 to 9.0:1. A higher content of pigment is desirable in order to achieve qualities such as sanding quality or high layer thickness; on the other hand, the viscosities are enhanced by the high pigment content. It is possible to influence hue, density and anti-corrosive effects by the choice of the pigments. It is preferred to use 0.01 to 5% of an anti-corrosive pigment relating to the total solids content of the spot filler. Anti-corrosive pigments which do not contain chromates are preferred.

The spot fillers can contain conventional lacquer adjuvants such as catalysts, agents which adjust the rheology, anti-settling agents, flow-promoting agents, defoaming agents, e.g. silicone-containing compounds; emulsifiers, e.g. anionic or kationic emulsifiers; wetting agents as well as adhesion mediators. Wetting agents include conventional paste resins, as e.g. described in EP-A-0 260 447, which are used in order to improve the dispersability and grinding qualities of the pigments. It is possible to use catalysts in order to accelerate curing. Further, small amounts of neutralizing agents are contained in the coating agents.

Solvents, which can be used in small amounts in order to adjust flow or viscosity, are conventional lacquer solvents; they can also be derived from the preparation of the binders. Examples for such solvents are monohydric or multihydric alcohols e.g. propanol, butanol, hexanol; glycol ethers or glycol esters, e.g. diethylene glycol dimethyl ether, ethoxy propanol, butyl glycol; glycols, e.g. ethylene glycol; N-methylpyrrolidone and ketones, such as methyl ethyl ketone, acetone, cyclohexanone; aromatic or aliphatic hydrocarbons, e.g. toluene, xylene or linear or branched aliphatic $C_6$–$C_{12}$ hydrocarbons. They should only be present in small amounts.

Preferably, the spot fillers do not contain any lower molecular unsaturated monomers, especially they should not contain any styrene.

The solids content of the spot fillers is 50 to 90 wt %, preferably 60–85 wt %. The water content is 10 to 40 wt %, preferably 15–35 wt %. The amount of solvents is less than 10 wt %, preferably less than 5 wt %, relating to the total spot filler.

The processes for the preparation of the aqueous spot fillers correspond to the processes for the preparation of conventional solvent-containing spot fillers. As an example, the aqueous binder dispersion can be mixed under intensive agitation with pigments, fillers, adjuvants and auxiliary substances. After thorough homogenization the mixture can optionally be ground to the desired particle size. Suitable grinding devices are described in the literature. If necessary, it is possible to add to the coating agent further optional different binders as well as further adjuvants, after grinding. Then, a suitable viscosity can be adjusted by the addition of water or portions of organic solvents. A usable process is described in DE-A 42 04 610.

The obtained spot fillers are high-viscous, paste-like compositions. They are storage stable and they do not show any sedimentation or essential changes of the viscosity. They can be applied by spatula, painting, brushing or coating knife. It is possible to apply thick layers by adjusting of a suitable viscosity, e.g. up to several millimetres. Such thick layers are stable after application, no sagging occurs. They dry quickly, even in lower layers. It is also possible to apply several spot filler layers in turn; this can be achieved after a short aeration or after drying of the spot filler coating. The spot filler contains only small amounts of organic solvents. Therefore, no bad smells occur during processing.

The spot fillers can be used in the form of one-layer surfacers or in the form of thick-layer surfacers. It is possible to apply the spot fillers, e.g. to conventional metal or plastic surfaces. Such surfaces can optionally be provided with a primer or coating, e.g. with an adhesive coating or an anti-corrosive coating. After application of the surfacer layer, the surface is smoothed and can then be dried. It is also possible to dry at elevated temperatures; however, it is preferred to dry at room temperature. Drying times can be from 20 minutes to 24 hours. The drying time is influenced by the temperature, the catalysts and the thickness of the layer.

After drying, the surface can be treated mechanically, e.g. by sanding. It is possible to achieve an extremely smooth surface which is free from defects. Then further layers of the coating can be applied in accordance with known processes. Thus, it is possible to achieve multi-layer coatings. Examples for further sequences are primer, primer surfacer, top coat or primer, gravel-resistent layer, base lacquer and clear coat. It is possible to use any commercial lacquer materials on an aqueous basis as well as on a solvent basis. No interaction with the spot filler occurs.

The obtained multi-layer coatings have a good elasticity. They have a good adhesion to the support, even under humid conditions. No corrosion occurs on metallic supports. The surface of the substrates coated in accordance with the invention is smooth and homogene and demonstrates a good optical appearance. The hardend spot filler layers can optionally be sanded; however, it is also possible to coat them directly. Adhesion to following layers is good. The spot fillers of the invention are preferably used for coating vehicles, particularly for repair coatings of automotive vehicles.

In the following examples the percentages refer to the weight.

EXAMPLE 1

The following starting materials are thoroughly stirred and homogenously mixed. 45% of a 30% solution of a polybutadiene-styrene-acrylic acid-copolymerisate in water (Bayhydrol B 130$^R$, acid number ca. 70–80) are admixed with 0.7% commercial siccatives on the basis of cobalt and manganese and with 0.1% of a black pigment, 2.2% of a yellow pigment and 10% titanium dioxide. 19.2% slate flour and 22% talc are stirred in. The mixture is mixed with 0.4% of a commercial aqueous thickener (carboxyl group-containing acrylic ester copolymer). After thorough homogenization the composition is ground on a three-roll-mill.

Solids content 65%; pigment-binder ratio 4.5:1; water content 32%.

EXAMPLE 2

27.2% of a 30% solution of a polybutadiene-styrene-acrylic acid-copolymerisate in water (Bayhydrol B 130$^R$) are mixed with 0.5% of a commercial siccative on the basis of cobalt and manganese, 0.6% of a modified multi-layer silicate (Bentone 34), 1.5% of a red pigment on the basis of iron oxide and 0.5% of a black pigment. 45.2% of a white pigment on the basis of ZnS and BASO$_4$ (Lithopone) and 24.5% talc are stirred in. After thorough homogenization of the components of the spot filler, the mixture is ground on a three-roll-mill.

Solids content 81%; pigment-binder ratio 8:1; water content 18%.

EXAMPLE 3

The spot fillers prepared in accordance with example I are applied onto an untreated steel sheet. The coating layer is 300 um thick. The layers are stable in form and do not sag even on vertical surfaces. Drying is achieved within 1–2 hours at room temperature.

EXAMPLE 4

Example 3 is repeated, however, the spot filler of example 2 is applied to achieve a layer thickness of 200 μm.

EXAMPLE 5

The spot filler prepared in accordance with example 1 is applied to a commercial pre-treated steel sheet. The layer thickness is ca. 350 μm.

EXAMPLE 6

Example 5 is repeated, however the spot filler of example 2 is applied to achieve a layer of 200 μm. It is dried at 40° C. within 1 hour.

The achieved dried spot fillers can be sanded. They have a good adhesion to the support and they show a good elasticity. After drying, the surface is sanded. Then the layers of examples of 3 and 4 are coated with a water dilutable two-component (2K) primer on epoxide basis, a 2K-polyurethane surface primer and a 2K top coat on polyurethane basis. The layers of examples 5 and 6 are coated with a conventional 2K polyurethane primer, a 2K surface primer on epoxide basis, a 1K base coat and a 2K clear coat on polyurethane basis. In each case smooth and good adhering layer coatings are achieved.

Each of the structures achieved in examples 3 to 6 shows a good elasticity and a good adhesion to the support.

I claim:

1. A process for preparing a multi-layer substrate, comprising applying the following aqueous spot filler to a single or multi-layer substrate, and optionally applying additional layers thereto with intermediate drying, said aqueous spot filler containing at least one water dilutable, olefinically unsaturated binder, conventional pigments, fillers and adjuvants, corresponding to a solids content of 50–90 wt %

10–40 wt % of water and

0–10 wt % of one or more organic solvents, the water dilutable, olefinically unsaturated binders containing anionic groups or groups convertible to anionic groups, corresponding to an acid number of 25–175 and being the reaction products of A) 40–80 wt % of one or more polydiene oils, B) 5–25 wt % of one or more polymerisable olefinically unsaturated monomers containing anionic groups or groups convertible to anionic groups, C) 0–10 wt % of one or more bis-(2-oxazolines) and D) 0–40 wt % of one or more ethylenically unsaturated monomers, the percentages of A), B), C) and D) adding up to 100 wt %.

2. A process for repairing a defective coating of a motor vehicle body, which comprises applying the following aqueous spot filler to the defective portion of the body, said aqueous spot filler containing at least one water dilutable, olefinically unsaturated binder, conventional pigments, fillers and adjuvants, corresponding to a solids content of 50–90 wt %

10–40 wt % of water and

0–10 wt % of one or more organic solvents, the water dilutable, olefinically unsaturated binders containing anionic groups or groups convertible to anionic groups, corresponding to an acid number of 25–175 and being the reaction products of A) 40–80 wt % of one or more polydiene oils, B) 5–25 wt % of one or more polymerisable olefinically unsaturated monomers containing anionic groups or groups convertible to anionic groups, C) 0–10 wt % of one or more bis-(2-oxazolines) and D) 0–40 wt % of one or more ethylenically unsaturated monomers, the percentages of A), B), C) and D) adding up to 100 wt %.

\* \* \* \* \*